(12) United States Patent
Uji et al.

(10) Patent No.: US 6,964,700 B2
(45) Date of Patent: Nov. 15, 2005

(54) INK FOR USE IN INK JET RECORDING AND INK JET RECORDING METHOD UTILIZING THE SAME

(75) Inventors: Ayako Uji, Tokyo (JP); Noribumi Koitabashi, Kanagawa (JP); Yoshihisa Yamashita, Kanagawa (JP); Ryota Kato, Kanagawa (JP); Takeshi Miyazaki, Kanagawa (JP); Yasunori Fujimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/830,013

(22) Filed: Apr. 23, 2004

(65) Prior Publication Data

US 2004/0244642 A1 Dec. 9, 2004

(30) Foreign Application Priority Data

Apr. 24, 2003 (JP) ........................... 2003-119270
Apr. 8, 2004 (JP) ........................... 2004-114562

(51) Int. Cl.[7] ..................... C09D 11/02; G01D 11/00
(52) U.S. Cl. .................... 106/31.28; 106/31.43; 106/31.75; 106/31.51; 106/31.49; 106/31.52; 347/100
(58) Field of Search .................... 106/31.28, 31.43, 106/31.75, 31.51, 31.49, 31.52; 347/100

(56) References Cited

U.S. PATENT DOCUMENTS

| | | | |
|---|---|---|---|
| 5,221,334 A | 6/1993 | Ma et al. ................ 106/20 D |
| 5,519,085 A | 5/1996 | Ma et al. ................ 524/503 |
| 5,604,276 A | 2/1997 | Suga ..................... 524/100 |
| 6,367,921 B1 | 4/2002 | Kurabayashi et al. ...... 347/101 |
| 6,367,923 B1 | 4/2002 | Koitabashi .............. 347/101 |
| 6,379,000 B1 | 4/2002 | Koitabashi .............. 347/100 |
| 6,387,168 B1 * | 5/2002 | Koitabashi et al. ....... 106/31.6 |
| 6,435,677 B1 | 8/2002 | Koitabashi et al. ....... 347/96 |
| 6,454,402 B1 | 9/2002 | Koitabashi et al. ....... 347/100 |
| 6,471,348 B1 | 10/2002 | Koitabashi ............. 347/100 |
| 6,471,757 B1 * | 10/2002 | Koitabashi et al. ..... 106/31.28 |
| 6,494,569 B2 * | 12/2002 | Koitabashi et al. ....... 347/98 |
| 6,517,191 B1 | 2/2003 | Koitabashi .............. 347/43 |
| 6,527,385 B2 * | 3/2003 | Koitabashi et al. ....... 347/101 |
| 6,533,392 B1 | 3/2003 | Koitabashi .............. 347/43 |
| 6,533,409 B2 | 3/2003 | Koitabashi .............. 347/101 |

FOREIGN PATENT DOCUMENTS

| | | |
|---|---|---|
| JP | 2-276873 | 11/1990 |
| JP | 5-179183 | 7/1993 |
| JP | 7-53841 | 2/1995 |
| JP | 7-314708 | 12/1995 |
| JP | 8-118674 | 5/1996 |
| JP | 11-240145 | 9/1999 |
| WO | WO 96/18695 | 6/1996 |
| WO | WO 96/18696 | 6/1996 |

*Primary Examiner*—J. A. Lorengo
*Assistant Examiner*—Veronica F. Faison
(74) *Attorney, Agent, or Firm*—Fitzpatrick, Cella, Harper & Scinto

(57) ABSTRACT

An ink for use in ink jet recording which contains a dye and a pigment as colorants. The pigment is a self-dispersible pigment in which at least one anionic group is bonded directly or through another atomic group to a surface of the pigment, the dye is an anionic dye, 2-pyrrolidone is further contained in the ink as a solvent, and the mass-based content X of 2-pyrrolidone in the ink and the ratio Y of the pigment to the sum of the dye and the pigment satisfy the following formulas 1 to 3 at the same time:

$12 \leq X < 30$      formula 1

$50 \leq Y \leq 75$      formula 2

$Y \geq -2X + 84$      formula 3.

13 Claims, 12 Drawing Sheets

U.S. PATENT DOCUMENTS

| | | | |
|---|---|---|---|
| 6,540,344 B2 | 4/2003 | Kashiwazaki et al. | 347/100 |
| 6,550,904 B2 | 4/2003 | Koitabashi et al. | 347/100 |
| 6,557,991 B2 | 5/2003 | Koitabashi et al. | 347/101 |
| 6,585,815 B2 | 7/2003 | Koitabashi et al. | 106/31.27 |
| 2002/0033869 A1 | 3/2002 | Kurabayashi et al. | 347/100 |
| 2002/0039130 A1 | 4/2002 | Koitabashi | 347/100 |
| 2003/0024434 A1 | 2/2003 | Butler et al. | 106/31.28 |

* cited by examiner

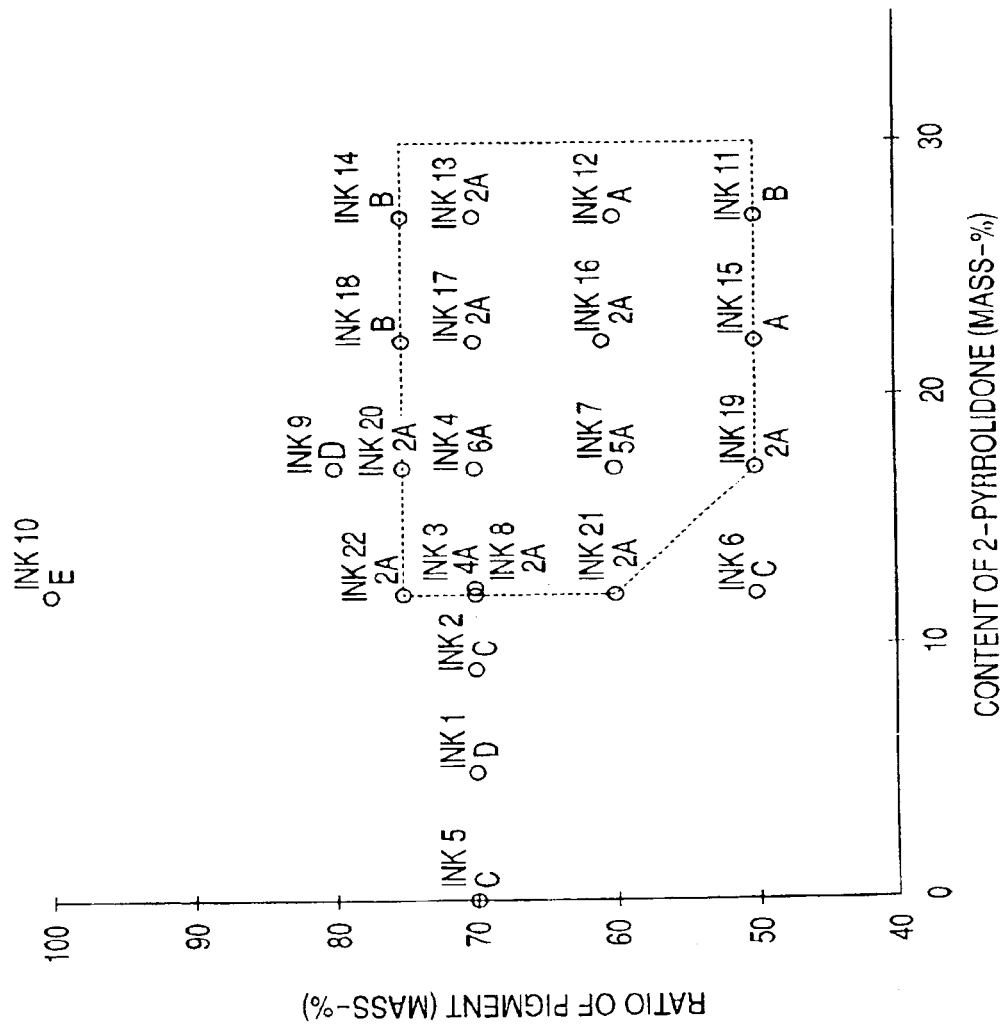

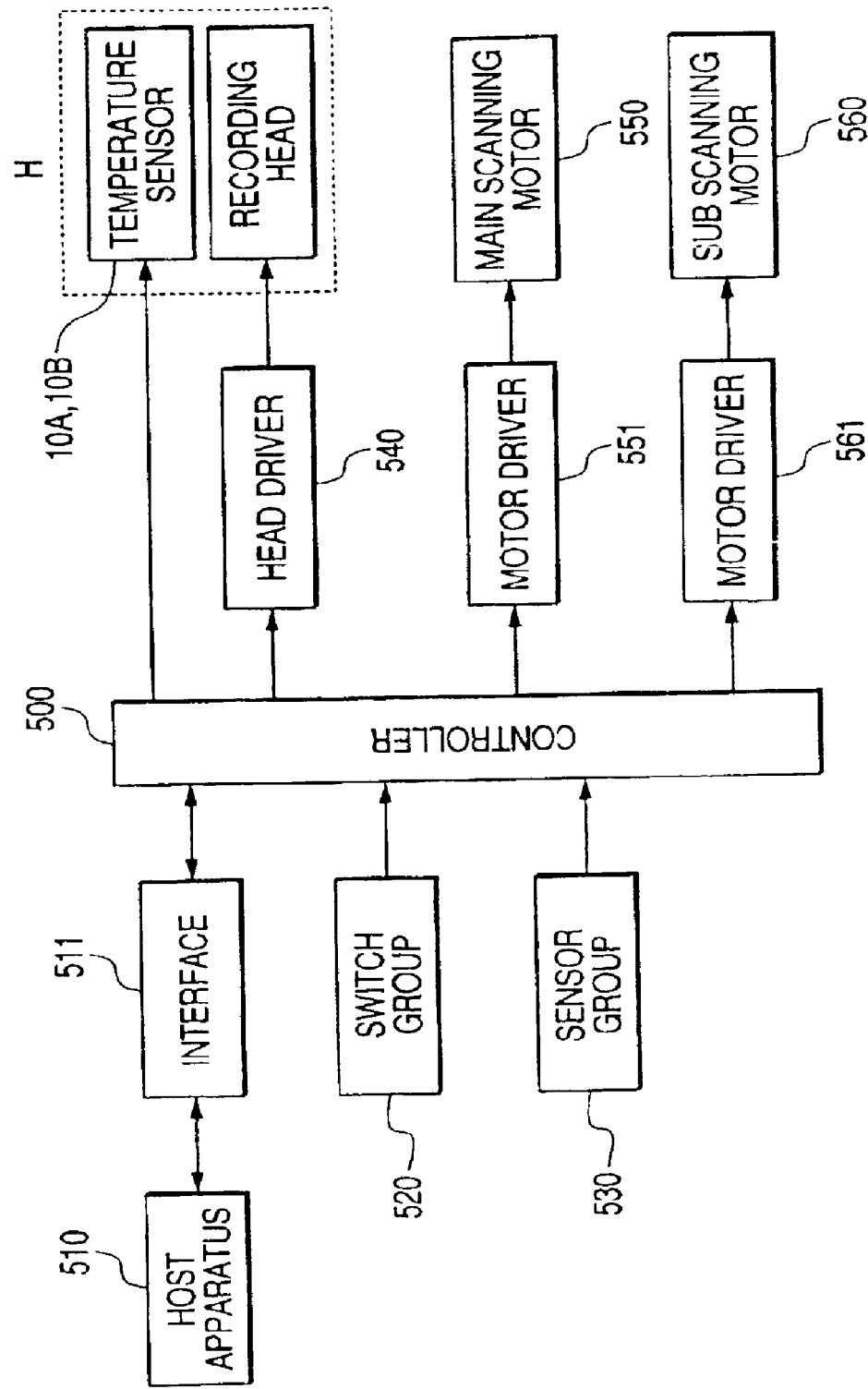

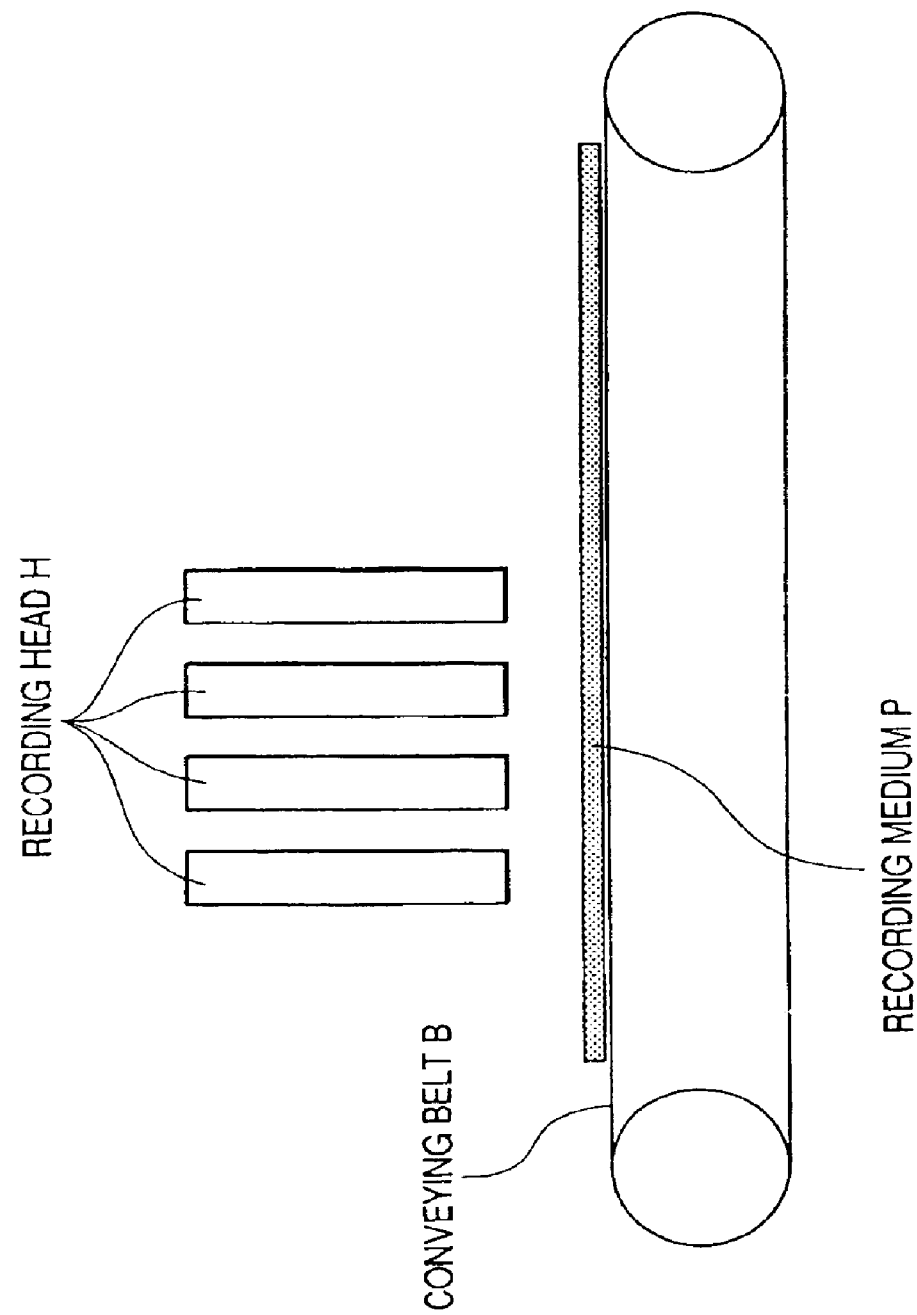

INK FOR USE IN INK JET RECORDING AND INK JET RECORDING METHOD UTILIZING THE SAME

BACKGROUND OF THE INVENTION

1. Field of the Invention

The present invention relates to an ink, particularly an ink for use in ink jet recording, and an ink jet recording method utilizing the same. The present invention also relates to an ink capable of improving (namely extending) a maximum elapsed time from the end of ink ejection by an ink jet ejection unit to a time when a next normal ink ejection is still possible (such time being called first-ejection time in the present specification), while maintaining a sufficient density in a recorded image, and relates to the equipment utilizing such ink. The ink of the present invention is most suited for an ink jet head of an ejection amount of 10 picoliters or less, and is applicable to all equipment capable of recording on various recording media (printing media) such as paper, cloth, leather, non-woven cloth, OHP sheets etc., for example office equipment such as a printer, a copying apparatus, or a facsimile employing an ink jet recording method.

2. Related Background Art

An ink jet printing method has various advantages such as a low noise level, a low running cost, the possibility of high-speed printing, easy compactization of the apparatus, easy color image formation etc., and is therefore widely employed in a printer, a copying apparatus etc. In such a printer or the like, ink to be employed is selected in consideration of printing characteristics, such as an ejection property and a fixing property, and a print quality, such as bleeding in the printed image, optical reflective density, and color developing property.

It is well known that the ink is divided, in terms of a colorant contained therein, into two categories: a dye based ink and a pigment based ink. Among these, the pigment ink containing a water-insoluble colorant has advantages such as superiority in water resistance and light fastness, and sharp character quality in comparison with the dye ink containing a water-soluble colorant.

As an example of pigment ink to be employed in the ink jet recording, a pigment ink utilizing a dispersant is known. For example, Japanese Patent Application Laid-open No. 5-179183 (JPA 5-179183) discloses a pigment ink utilizing, as a pigment dispersant, a block polymer of the so-called AB, or BAB type. Also Japanese Patent Application Laid-open No. 7-53841 (JPA 7-53841) discloses a pigment ink utilizing a triblock polymer of the ABC type as a dispersant. For improving the fixing speed of a pigment dispersed by a dispersant of such type and increasing the optical density and the water resistance thereof, JPA 7-53841 is known to disclose, as essential conditions, two solvents constituted of a polyol/alkylene oxide condensate and a cyclic amide derivative such as 2-pyrrolidone for dissolving the same. JPA 7-53841 recognizes that a drying fixation speed of the ink and a solvent evaporation from the nozzle or a clogging therein are mutually contradictory factors, and, discloses an invention for improving the fixation speed of the pigment utilizing a dispersant, in comparison with a comparative example employing a cyclic amide derivative alone such as 2-pyrrolidone. JPA 7-53841 does not describe at all an ink jet head to be used.

Also there is known a pigment ink employing a self-dispersible pigment, without utilizing a dispersant such as the aforementioned block polymer. For example, WO 96/18695 and WO 96/18696 disclose a pigment utilizing carbon black on which a hydrophilic group is directly bonded to the surface. Such pigment ink aggregates without penetrating into a printing medium (recording medium) in an image dot formation. As a result, the colorant (pigment) becomes unevenly distributed in the vicinity of the surface of the printing medium.

An image formed by a pigment ink, observed in a single dot, has a uniform density distribution, and is considered acceptable in its outer shape. However, in the ink jet recording, the dot diameter of the pigment ink does not spread much. Therefore, a further improvement in the pigment is desirable in order to obtain a larger area factor in the ink jet recording. Also in the conventional pigment ink, in case a printing medium on which such pigment ink is applied has an insufficient ink absorbing property, the pigment aggregates on the surface of such a medium, thereby resulting in an image deficient in the uniformity of the colorant fixation. Also not only does a pigment ink in which the aforementioned aggregation reaction is relatively strong cause an uneven aggregation as in the conventional pigment ink, but also it may generate a colorant-lacking portion of a "crack" shape in the pigment fixed on the printing medium. Such a "crack" has a relatively large size that is noticeable also by the bare eyes, so that such a "crack" itself deteriorates the print quality. Also such crack portion exposes the background of the printing medium, thereby resulting in a decrease in the overall optical density. Such a "crack" often appears on a printing medium bearing a coated layer (resin layer) for accepting the ink, such as a transparency film. This is because the aggregation of the pigment is influenced by a substance contained in the resin layer. Particularly, in the case where the resin layer contains a cationic substance, an ink of an anionic pigment shows a rapid aggregation. Basically, the aforementioned aggregation-related issues appear conspicuously in the case where a pigment ink alone is used for printing, but are found to occur also in an ink utilizing a dye and a pigment as colorants and requiring a dispersant for such pigment, as disclosed in Japanese Patent Application Laid-open No. 2-276873 (JPA 2-276873). For resolving such a "crack" problem, Japanese Patent Application Laid-open No. 11-240145 (JPA 11-240145) discloses an invention based on a combination of a self-dispersible pigment and a dye. Also U.S. Laid-Open No. 2003/0024434 Laid-open (US 2003/0024434) discloses an ink utilizing a combination of a special self-dispersible pigment, a dye and plural solvents (a humectant and a penetrant) thereby satisfying high-speed fixation and optical density. US 2003/0024434 discloses, as an only example utilizing a printer of a trade name Lexmark Z51 (black ejection amount of 27 picoliters), a combination of self-dispersible pigment:dye= 1:1 and 7.5 mass % of 2-pyrrolidone. US 2003/0024434 suggests a range of pigment:dye from 0.75:1 to 2.5:1, but such disclosure is limited to a range where the optical density is considered satisfactory. Also it discloses a permissible range of 2-pyrrolidone of 3 to 10 mass %, but no basis therefor is disclosed.

For the ink to be used in the ink jet recording method, it is important, in addition to the properties relating to the image quality, to secure stable ink ejection even in the case of intermittent ejections. In case an ink jet printing head having a plurality of nozzles is paused and is exposed to the air, there results evaporation of water or a solvent in the vicinity of the ejection orifice, depending upon a non-ejection time including a difference in the ejection history of each nozzle, whereby a normal printing operation cannot be executed in certain nozzles. Thus the ink is not ejected uniformly from the nozzles, thus generating a defect on the image or causing a deflection in the ejecting direction, thereby deteriorating the print quality. For this reason, in the conventional ink jet head, there is executed an ejection not for recording (such ejection being called a preliminary ejection) even by interrupting a recording operation, in order to apply a safety factor on a non-ejection time inducing such ejection failure, thereby securing the reliability of the head. Since such preliminary ejection often interrupts the recording operation, it is proposed, in order to shorten the time of suspension as far as possible, to provide ink receiving portions on both ends outside a recording area and to execute the preliminary ejection in a closer ink receiving portion depending on the position of the scanning head (for example Japanese Patent Application Laid-open No. 8-118674 (JPA 8-118674), or to execute the preliminary ejection on an end portion of a paper constituting the recording medium (for example Japanese Patent Application Laid-open No. 7-314708 (JPA 7-314708).

It is generally considered that an ink employing a dye as the colorant does not influence a next printing even in case of exposure to the air for several seconds because the dye is water-soluble, while an ink employing a pigment as the colorant, because the pigment is insoluble in the liquid medium of the ink, tends to cause a clogging of the ejection orifice of the printing head in case of a prolonged exposure and shows a higher possibility of influencing a next printing operation, in comparison with the dye ink.

SUMMARY OF THE INVENTION

As explained in the background art, the maximum elapsed time, or the first-ejection time, from the end of ejection by the ink jet ejection unit to a time when a next ejection can still be executed normally is already recognized, but there has not been made a technical advancement for extending such time. Particularly in recent years with a shift from a technical level of an ejection amount as large as 30 picoliters (corresponding to a large aperture area in the ejection orifice) to a technical level in which the ejection aperture area and the ejection amount are reduced to achieve a high-speed print of a high image quality, such as 600 dpi or higher and 10 picoliters or less, the first-ejection time is becoming more and more shorter from the configuration of the apparatus.

The present invention has recognized, as a new target, the provision of an ink capable of improving (extending) a maximum elapsed time, or a first-ejection time, from the end of ejection by the ink jet ejection unit to a time when a next ejection can still be executed normally, and has been made as a result of intensive investigations on an ink containing a self-dispersible pigment and a dye. In the course of such investigations, the present inventors have acquired knowledge that an ink droplet, ejected from a nozzle after a pause for a certain time, even if properly ejected, may result in a decrease in the density of an image formed by such an initial ink droplet, or may result in a deterioration of the image quality by a decrease in the image density when an entire image is formed. In an investigation with a variation in the ink composition (particularly a pigment:dye ratio and 2-pyrrolidone content in the ink) and the ink temperature (particularly at the normal temperature and at a high temperature), it is found that such a phenomenon is also influenced by these parameters.

Therefore, a first object of the present invention is to provide an ink capable of preventing a decrease in the optical image density by a first ink droplet immediately after the first-ejection time, and capable of achieving an extension of the first-ejection time, that has not been attained in the prior technology, while satisfying the optical image density (hereinafter represented as OD) of the entire image.

A second object of the present invention is to provide an ink capable of achieving an extension of the first-ejection time, for an ink jet head of the type which executes ink jet recording while the ink jet head is regulated at a temperature higher than the room temperature environment.

Still other objects of the present invention will become fully apparent from the following description.

The present invention, attaining the aforementioned objects, provides an ink for use in ink jet recording including a self-dispersible pigment in which at least one anionic group is bonded directly or through another atomic group to the surface of the pigment and an anionic dye, as colorants, and 2-pyrrolidone as a solvent, wherein the content X (mass %) of 2-pyrrolidone in the ink and the ratio Y of the pigment to the sum of the dye and the pigment respectively satisfy $10<X<30$ and $50 \leq Y \leq 75$, and the ink has a first-ejection time of 7 seconds or longer as measured using an ink jet head with an ejection amount of 4.5 picoliters. The present invention is particularly effective in a configuration in which the aforementioned ink is used in an ink jet head with an ejection amount of 10 picoliters or less.

More preferably, the present invention provides an ink for use in ink jet recording containing a dye and a pigment, wherein the pigment is a self-dispersible pigment in which at least one anionic group is bonded directly or through another atomic group to the surface of the pigment, and the dye is an anionic dye, wherein 2-pyrrolidone is further contained as a solvent, and the content X (mass %) of 2-pyrrolidone in the ink and the ratio Y of the pigment to the sum of the dye and the pigment satisfy the following formulas 1 to 3 at the same time when the ink temperature is at a normal temperature or/and at a regulated high temperature:

Normal Temperature:

| | |
|---|---:|
| $12 \leq X < 30$ | formula 1 |
| $50 \leq Y \leq 75$ | formula 2 |
| $Y \geq -2X + 84$ | formula 3 |

High Temperature:

| | |
|---|---:|
| $12 \leq X < 30$ | formula 1 |
| $50 \leq Y \leq 75$ | formula 2 |
| $Y \geq (-4/3)X + 86.$ | formula 3 |

The aforementioned invention helps prevent a decrease in the optical image density by a first ink droplet immediately after a first-ejection time, and is capable of improving the first-ejection time, that has not been improved in the prior technology, to at least 1.5 times of the prior technology, while satisfying the optical image density (hereinafter represented as OD) of the entire image, thereby improving the reliability of the ink. As a result, high-quality printing can be achieved without an image defect or an ejection failure, thus providing a high-quality image with an excellent throughput. Particularly, in the case of since an ink jet head with an ejection amount of 10 picoliters or less, there is a tendency that a first-ejection time becomes n seconds when an ejection amount is n picoliters. Therefor the ink of the present invention is extremely effective in the case of forming a high-quality image at a high speed and with a small liquid droplet.

BRIEF DESCRIPTION OF THE DRAWINGS

FIGS. 3A and 3B are graphs showing a range in which a first-ejection time is satisfactory with respect to a relationship between a pigment-to-dye ratio in an ink and a 2-pyrrolidone content in an ink of an embodiment of the present invention, respectively in a normal temperature state and a high temperature state of the ink;

FIG. 10 is a block diagram showing d configuration of a control system in an ink jet recording apparatus to which the present invention is applicable; and FIG. 11 is a schematic view showing the configuration of another ink jet recording apparatus to which the ink of the present invention is applicable.

DETAILED DESCRIPTION OF THE PREFERRED EMBODIMENTS

In the following, the present invention will be clarified further by preferred embodiments.

The present inventors have investigated the first-ejection property when the ink is in a normal temperature and when the ink is regulated at a high temperature, by varying the ratio of a pigment and a dye in the aforementioned colorants in the ink and the mass % content of 2-pyrrolidone in the ink and assuming various printing environments. The aforementioned "normal temperature" of the ink means from 15 to 35° C., and the "high-temperature", assuming a temperature regulation, means a temperature higher than the normal temperature. In the present invention, the temperature regulation is performed based on a temperature setting of from 40 to 50° C. Also, the aforementioned first-ejection property is defined by "time of suspension (also called a suspension time) of ink ejection from a certain nozzle of an ink jet recording head, after which time the ink can still be normally ejected from such nozzle", and the first-ejection property is satisfactory (improved) in the case where the ink is re-ejected normally after a longer suspension of the ink ejection.

For a specific evaluation, after ink of a predetermined amount is ejected from all nozzles, the ink ejection is suspended for a predetermined time. Then a first ejection state, when the ink is again ejected from all the nozzles, is evaluated, and the following cases 1), 2) and 3) are regarded as unacceptable while other cases are regarded as a normal ejection, and a longest time capable of normal ejection among the aforementioned suspension times is defined as the first-ejection time of the ink:

1) no ejection;
2) ejection is possible, but the dot density is lower than that in an acceptable range for an image (density is about 50% or less) in comparison with an ejection state without a suspension time;
3) ejection is possible, but the dot impact position deviates outside an acceptable range for an image (positional deviation in excess of 1 pixel) in comparison with an ejection state without a suspension time.

Figure 1A:
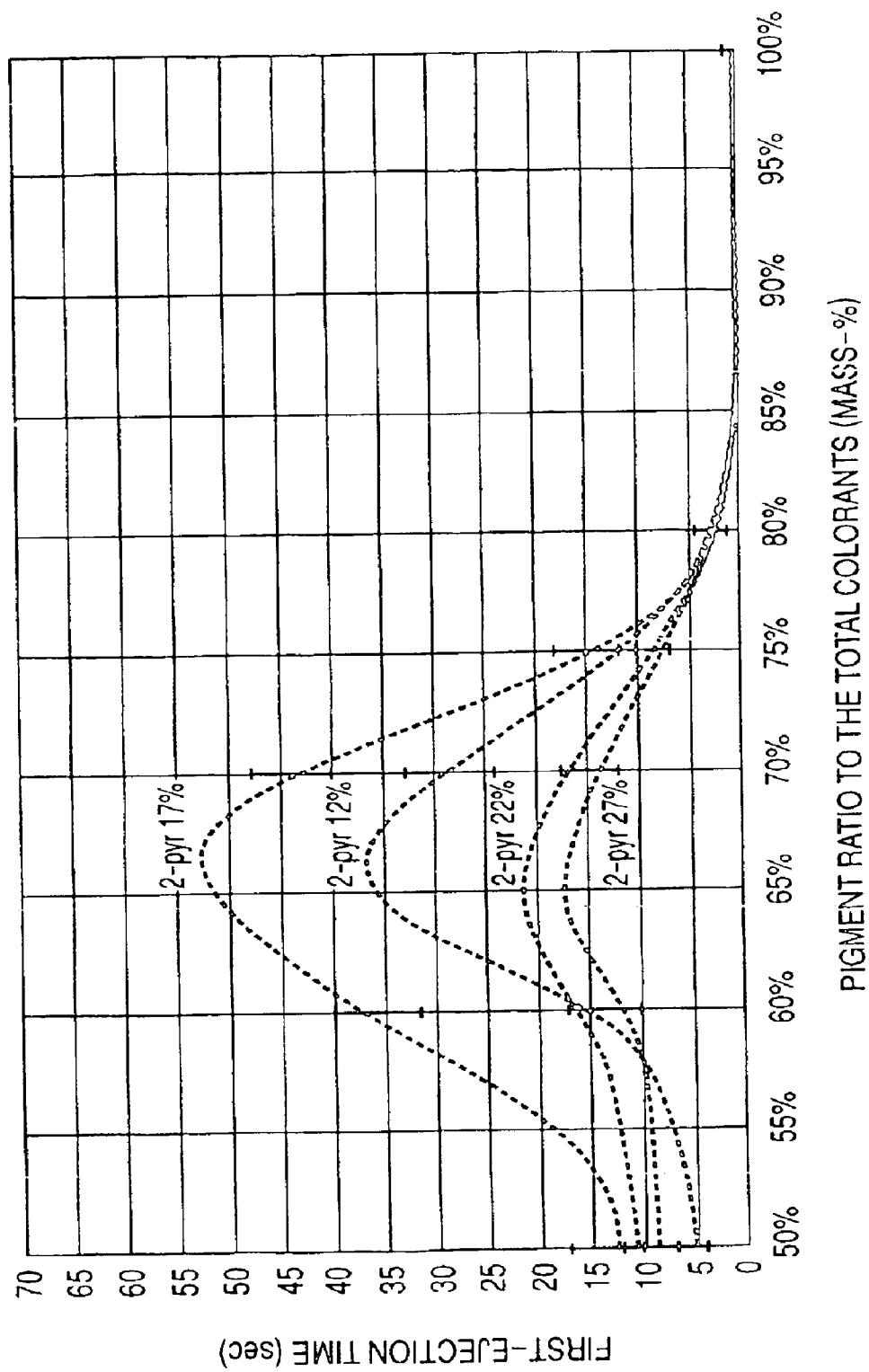
FIGS. 1A and 1B are graphs showing a relationship between a pigment-to-dye ratio in an ink and a first-ejection time in an ink of an embodiment of the present invention, respectively in a normal temperature state and a high temperature state of the ink.
Figure 1B:
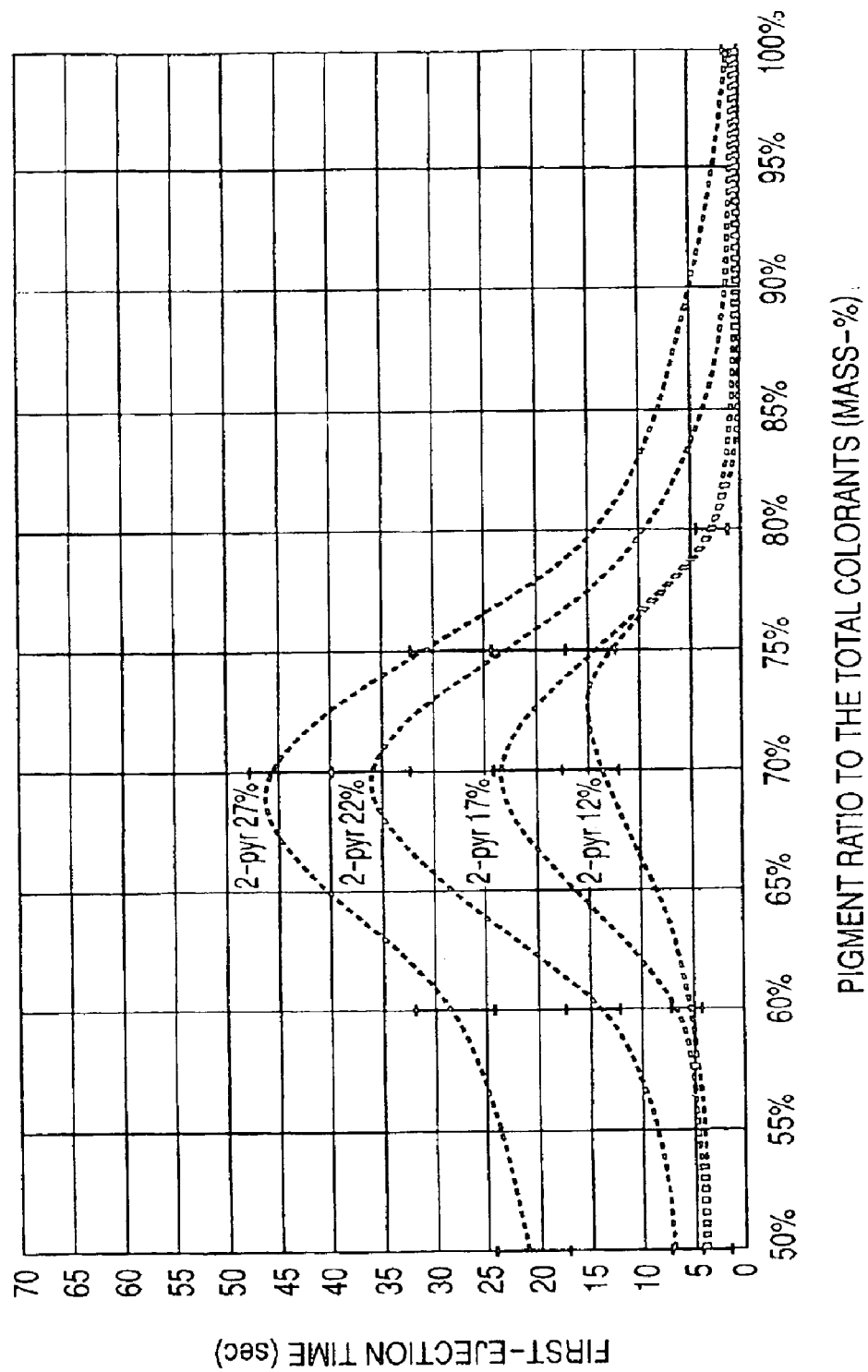

FIGS. 1A and 1B schematically show an evaluation of the first-ejection property when the pigment-dye ratio in the colorants and the amount of 2-pyrrolidone are changed. The ordinate indicates a maximum length of the suspension time at which the ink re-ejection from the nozzle is executed normally. Details will be explained later, but the first-ejection time is represented with an error bar of a certain range because of a reason in evaluation.

FIG. 1A shows a case where the ink is at the normal temperature, and FIG. 1B shows a case where the ink is at a high temperature. Based on these results, it is found that the pigment-dye ratio, the amount of 2-pyrrolidone and the ink temperature are important factors on the first-ejection property.

A pigment-dye ratio providing a satisfactory first-ejection property, though dependent also on the amount of 2-pyrrolidone, is within a range of 5:5 to 7.5:2.5, particularly 6.5:3.5 to 7:3, but a higher ink temperature is found to cause a shift toward a higher pigment ratio.

Figure 2A:
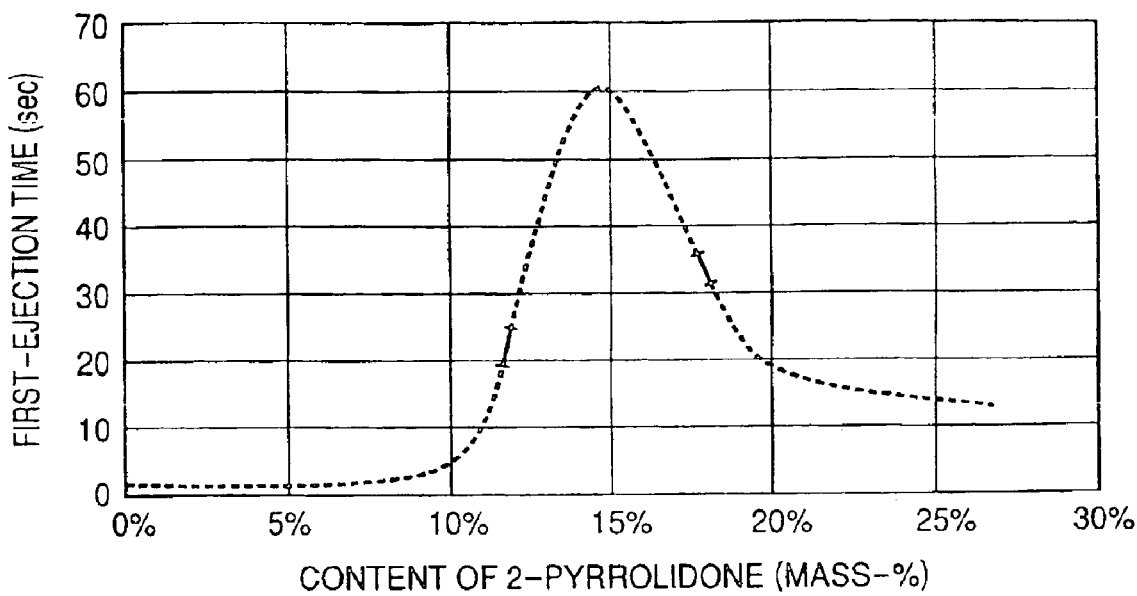
FIGS. 2A and 2B are graphs showing a relationship between a 2-pyrrolidone content in an ink and a first-ejection time in an ink of an embodiment of the present invention, respectively in a normal temperature state and a high temperature state of the ink.
Figure 2B:
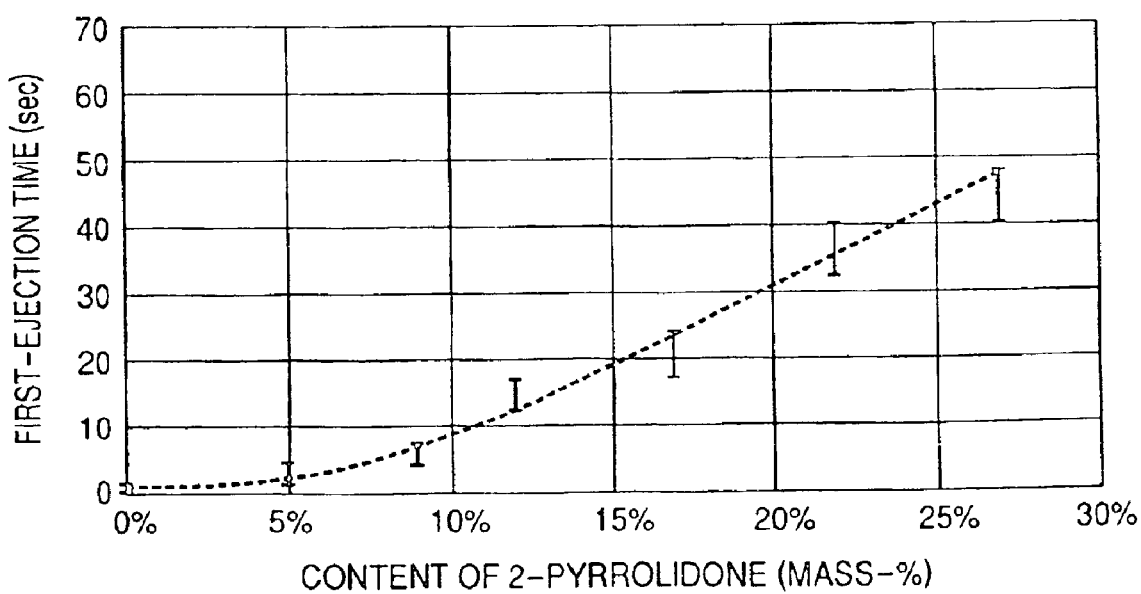

Then, FIGS. 2A and 2B show a schematic relationship between the amount of 2-pyrrolidone and the first-ejection property. FIG. 2A shows a case where the ink is at the normal temperature, and FIG. 2B shows a case where the ink is at a high temperature. In FIG. 2B, the result of evaluation is also indicated with an error bar, in consideration of a fluctuation in the temperature control. In either environment, the first-ejection property is rapidly improved in the case where the amount of 2-pyrrolidone reaches 12 mass % or higher. However, as shown in FIGS. 1A and 1B, the characteristics vary depending on the temperature environment when the content increases. At the normal temperature, the first-ejection property becomes sufficiently satisfactory at a content of 15 mass % or higher, but the first-ejection time tends to become shorter. On the other hand, at the high temperature, the first-ejection time tends to become longer approximately in proportion to the content of 2-pyrrolidone until it reaches 27 mass %.

As will be apparent from the foregoing, the first-ejection property can be drastically improved by including 2-pyrrolidone by 12 mass % or more in the ink. However, since an increase in the amount of 2-pyrrolidone may result in peeling of a nozzle member etc. constituting the head as will be explained later, the content is preferably 30 mass % or less in consideration of the reliability of the equipment.

Also the results in FIGS. 1A and 1B indicate that a sufficient first-ejection property may not be obtained even with a content of 2-pyrrolidone of 12 mass % or higher, in the case where the colorant is constituted of pigment only. Thus, the pigment-dye ratio and the amount of 2-pyrrolidone are both important factors for the first-ejection property.

It is also clarified that an effect on the first-ejection property can be obtained by regulating the ink at a certain temperature range according to the solvent composition of the ink. The temperature regulation also provides another effect of providing the same ejection characteristics in any environment, thereby providing a constant image quality.

With respect to the temperature regulation, it is however confirmed that a temperature increase does not necessarily improve the first-ejection property. As explained in the foregoing, a satisfactory range of the first-ejection property is variable depending on the 2-pyrrolidone content and the ink temperature. It is therefore possible to improve the first-ejection property by executing the temperature regulation according to the 2-pyrrolidone content. Furthermore, in order to further improve the first-ejection property in the ink, it is preferable to suitably execute the temperature regulation of the ink according to the pigment-dye ratio contained as the colorants in the ink. These factors will be explained in more details in the following.

Figure 3B:
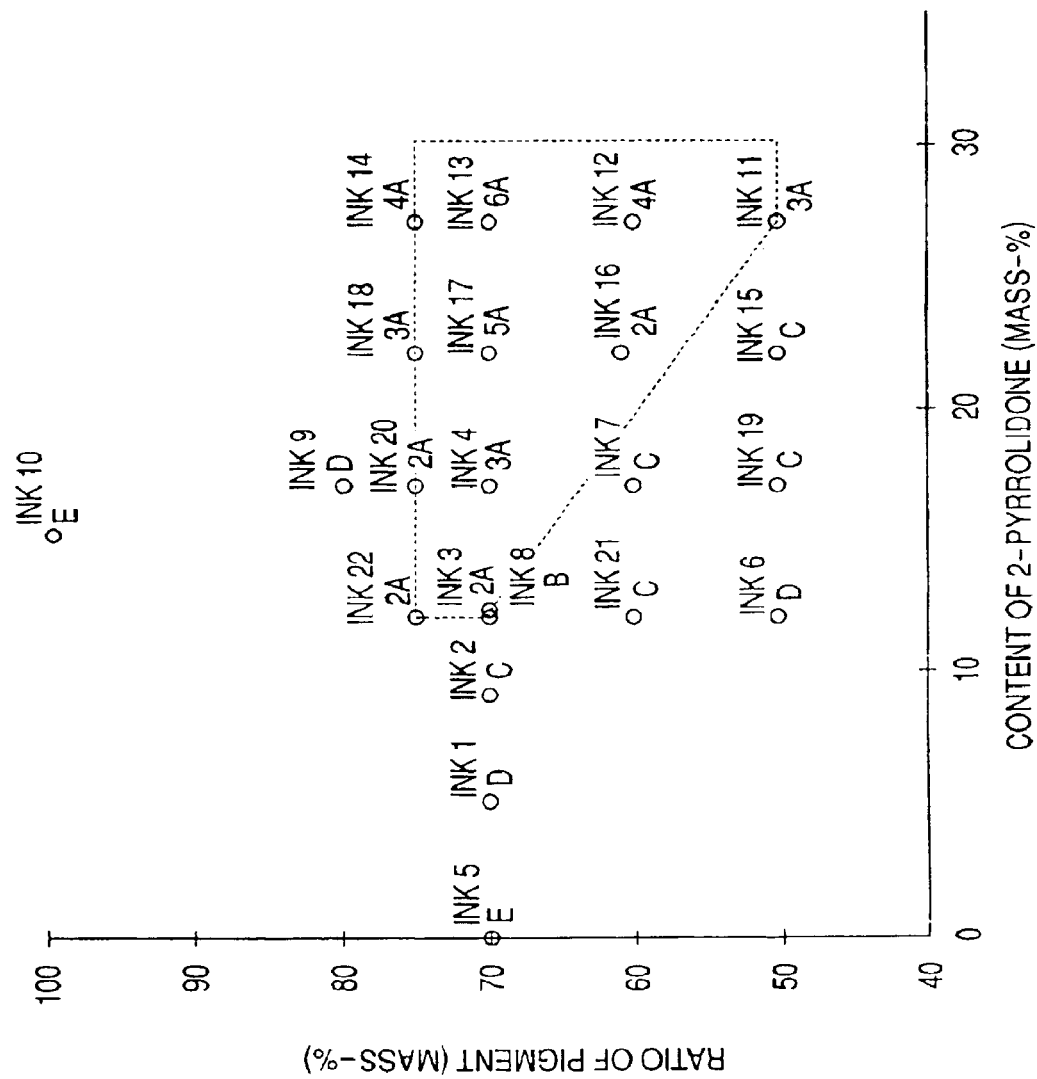

FIGS. 3A and 3B show a detailed relationship of the first-ejection property with the amount of 2-pyrrolidone (mass %) and the pigment ratio (mass %) in the colorants being two axes. FIG. 3A shows a case where the ink is at the normal temperature, and FIG. 3B shows a case where the ink is at a high temperature. An area surrounded by a broken line in these charts indicates an area of satisfactory first-ejection property, more specifically an area of a first-ejection time of 7 seconds or longer. Based on these results, in an ink composition with a first-ejection property contained in the satisfactory range, the content X (mass %) of 2-pyrrolidone in the ink and the ratio Y of the pigment to the sum of the dye and the pigment satisfy the following formulas 1 to 3 at the same time in the situations of FIG. 3A and FIG. 3B:

Case of FIG. 3A:

$$12 \leq X < 30 \quad \text{formula 1}$$

$$50 \leq Y \leq 75 \quad \text{formula 2}$$

$$Y \geq -2X + 84 \quad \text{formula 4}$$

Case of FIG. 3B:

$$12 \leq X < 30 \quad \text{formula 1}$$

$$50 \leq Y \leq 75 \quad \text{formula 2}$$

$$Y \geq (-4/3)X + 86. \quad \text{formula 3}$$

In the following, a detailed explanation will be given on an ink of an embodiment capable of attaining the objects of the present invention. An example of the ink of the present invention is one containing a self-dispersible pigment in which at least one anionic group is bonded directly or through another atomic group to the surface of the pigment and an anionic dye as colorant, and 2-pyrrolidone as a solvent, wherein the ink has a Ka value as determined by Bristow's method of less than $1 \ ml \cdot m^{-2} \cdot msec^{-1/2}$.

Such ink will be explained in the following.

A self-dispersible pigment in the present invention means a pigment that can maintain a stable dispersion state in water, a water-soluble organic solvent or a mixture thereof without employing a dispersant such as a water-soluble polymer compound and that does not generate, in such liquid, a mutual aggregate of the pigment which hinders a proper ink ejection from an orifice of the ink jet recording technology. The present invention employs such pigment in which at least one anionic group is bonded directly or through another atomic group to the surface of the pigment.

A specific example is carbon black in which at least one anionic group is bonded directly or through another atomic group to the surface.

Examples of the anionic group bonded to carbon black include —COOM, —$SO_3$M, —$PO_3$HM, —$PO_3M_2$, —$SO_2NH_2$, and —$SO_2$NHCOR (wherein M represents a hydrogen atom, an alkali metal, ammonium or an organic ammonium group, and R represents a linear or branched alkyl group with 1 to 12 carbon atoms, a substituted or non-substituted phenyl group or a substituted or non-substituted naphthyl group). In the case where R represents a phenyl group with a substituent or a naphthyl group with a substituent, such substituent of the phenyl or naphthyl group can be, for example, a linear or branched alkyl group with 1 to 6 carbon atoms.

The alkali metal for can be for example lithium, sodium or potassium, and the organic ammonium for "M" can be for example mono- to tri-methylammonium, mono- to tri-ethylammonium, or mono- to tri-methanol ammonium. Among these anionic groups, —COOM or —$SO_3$M is preferred because of a large effect for stabilizing the dispersion state of carbon black.

The aforementioned anionic groups are preferably boded to the surface of carbon black through another atomic group. Such another atomic group can be, for example, a substituted or non-substituted alkylene group with 1 to 12 carbon atoms, a substituted or non-substituted phenylene group or a substituted or non-substituted naphthylene group. The substituent that may be bonded to the phenylene or naphthylene group is, for example, a linear or branched alkyl group with 1 to 6 carbon atoms.

Specific examples of the anionic group bonded to the surface of carbon black through another atomic group include —$C_2H_4$COOM, -Ph$SO_3$M and -PhCOOM (wherein Ph represents a phenyl group and M has the same meaning as above), but these examples are not restrictive.

Carbon black, in which the aforementioned anionic group is bonded either directly or through another atomic group to the surface, can be produced for example by the following method.

For example, for introducing —COONa to the surface of carbon black, there can be employed a method of oxidizing commercially available carbon black with sodium hypochlorite. Also for bonding a —Ar—COONa group (Ar representing an aryl group) to the surface of carbon black, there may be employed a method of coupling a diazonium salt, formed by reacting a $NH_2$—Ar—COONa group with nitrous acid, to the surface of carbon black, but the present invention is naturally not limited to such methods.

As for the self-dispersible pigment, to be contained in the ink of the present embodiment 80 mass % or higher of such pigment, preferably has a particle size of 0.05 to 0.3 µm, particularly 0.1 to 0.25 µm. A particle size of the pigment less than 0.05 µm is difficult to provide an OD, while a particle size larger than 0.3 µm undesirably deteriorates the first-ejection property.

A method of preparation of the ink of the present embodiment is shown in the following examples.

As an anionic dye to be employed in the present embodiment, an acidic dye, a direct dye or a reactive dye known in the art can be advantageously employed. Particularly preferably, the dye has a skeleton of a disazo or trisazo structure. It is also preferable to employ two or more dyes of different skeletal structures. For example, in the case of preparing a black ink, it is possible to use dyes other than black dye, such as those of cyan, magenta, yellow etc. within such an extent that the color is not changed significantly. The aforementioned self-dispersible carbon black can be employed as a black pigment, and as a colorant in a black ink.

The ink of the present embodiment is not limited by the type (color) of dye and pigment, but a preferred embodiment employs carbon black as the colorant in a black ink. Such ink can provide an improvement in OD in printing characters. The amount of colorants, including the pigment and the dye, is 3 to 8 mass %, preferably 4 to 7 mass %, with respect to the entire ink amount. With respect to the pigment-dye ratio, in order to obtain a sufficient OD in the formed image and to improve the aforementioned first-ejection property, the ratio of pigment is within a range from 50 to 75%.

For the purpose of only securing a sufficient OD on the formed image, the proportion of the pigment with respect to the pigment-dye ratio can be selected within a range from 50% to less than 100%. In this manner, an OD of 1.2 or higher can be obtained for plain paper, even with an ink composition of a high penetrability, which is relatively difficult to provide a high OD. Also in a medium having a coated layer of the interspace absorption type, such as a glossy paper, an increase in the proportion of the pigment tends to reduce the OD, but a pigment proportion less than 90% allows to secure a sufficient OD. Further, an OD comparable to that in the case of employing a dye only can be secured with a pigment proportion less than 75%. Also in a medium having a coated layer of the swelling type, a pigment proportion within a range from 50% to less than 90% can provide a high-quality image with a high OD and reduced unevenness, and is therefore preferable.

An improvement in the first-ejection property is found in the ink of the present embodiment, particularly in the ink containing 2-pyrrolidone. A preferred content of 2-pyrrolidone is equal to or higher than 10 mass % but less than 30 mass % of the ink, more preferably from 12 to 27 mass %.

The ink of the present embodiment, containing the components explained above, when a Ka value as measured by Bristow's method is adjusted to less than 1 $(ml \cdot m^{-2} \cdot msec^{-1/2})$ in consideration of the penetrability into the printing medium, can provide image dots of an extremely uniform density. The penetrability of the ink into the printing medium is explained in detail in Japanese Patent Application Laid-open No. 11-240145.

The ink of the present invention can be prepared with a desired color by selection of the colorant. In the case of forming a multi-color image, there is employed a set of a cyan ink, a magenta ink and a yellow ink, or a set of a cyan ink, a magenta ink, a yellow ink and a black ink, and it is preferred that at least one of the inks constituting such ink set is an ink of the present invention. Particularly in an ink set including a black ink, at least the black ink is preferably formed by the ink of the present invention, since it can improve the OD of characters. Also in case of forming a multi-color image, other color inks to be employed with such black ink (for example yellow, cyan or magenta ink or a pale colored ink thereof) can be dye based inks of a relatively high penetrating speed, commonly employed in the ink jet recording of a multi-color image. Examples of compositions of such inks are shown in the following, wherein the total amount of the ink is set to 100 parts:

Yellow Ink
C.I. direct yellow 86 3 parts
glycerin 5 parts
diethylene glycol 5 parts
Acetylenol EH (Kawaken Fine Chemical) 1 part
water remainder Magenta Ink
C.I. acid red 289 3 parts
glycerin 5 parts
diethylene glycol 5 parts
Acetylenol EH (Kawaken Fine Chemical) 1 part
water remainder Cyan Ink
C.I. direct blue 199 3 parts
glycerin 5 parts
diethylene glycol 5 parts
Acetylenol EH (Kawaken Fine Chemical) 1 part
water remainder An ink jet recording method in a preferred embodiment of the present invention can be executed by a known ink jet recording method, except for employing the aforementioned ink of the present invention. More specifically, the ink of the present invention can be advantageously employed in a recording method by ejecting ink from a print head onto a printing medium. An ejection method in the print head can be a known method such as a piezo method, but a preferred embodiment is a method of applying thermal energy to the ink to generate a bubble therein, and ejecting the ink by the pressure of such bubble. Also in the aforementioned recording head, heating means for controlling the ink temperature is preferably provided in a location different from heating means for ink ejection, but such configuration is not restrictive.

Also an ink container, such as an ink cartridge containing the ink of the embodiment or a recording head integrating an ink containing part and an ink ejecting means and so constructed as to be detachably mounted on an ink jet printer, is also included in an embodiment of the present invention. Further, an ink set in which a black ink of the present embodiment containing the aforementioned self-dispersible carbon black as the colorant and other color inks are contained in respectively independent containers, is also included in an embodiment of the present invention. The printing medium to be used in the present embodiment is not particularly limited and can be, for example, paper, non-woven cloth, OHP sheets or leather. A specific example of the recording medium is a printing medium provided with a coated layer. The coated layer contains a water-soluble polymer or a water-dispersible polymer, and such water-soluble polymer can be, for example, at least one resin selected from polyvinyl alcohol, anion-modified polyvinyl alcohol, cation-modified polyvinyl alcohol, acetal-modified polyvinyl alcohol, aqueous polyurethane, polyvinylpyrrolidone, vinylpyrrolidone-vinyl acetate copolymer, vinylpyrrolidone-dimethylaminoethyl methacrylic acid copolymer, quaternalized vinylpyrrolidone-dimethylaminoethyl methacrylic acid copolymer, vinylpyrrolidone-methacrylamidepropyl chlorotrimethyl ammonium copolymer, carboxymethyl cellulose, hydroxyethyl cellulose, hydroxypropyl cellulose, cationized hydroxyethyl cellulose polyester, polyacrylic acid, polyacrylate ester, melamine resin, a graft copolymer containing polyester and polyurethane, albumin, gelatin, casein, starch, cationized starch, gum arabic and sodium alginate.

Also the aforementioned water-dispersible resin can-be, for example, at least one selected from polyvinyl acetate, ethylene-vinyl acetate copolymer, polystyrene, styrene-acrylate ester copolymer, styrene-methacrylate ester copolymer, acrylate ester copolymer, methacrylate ester copolymer, vinyl acetate-acrylic acid copolymer, vinyl acetate-acrylate ester copolymer, vinyl acetate-methacrylic acid copolymer, vinyl acetate-methacrylate ester copolymer, polyacrylamide, polymethacrylamide, acrylamide copolymer, methacrylamide copolymer, styrene-isoprene copolymer, polyvinyl ether and silicone-acryl copolymer.

Figure 4:
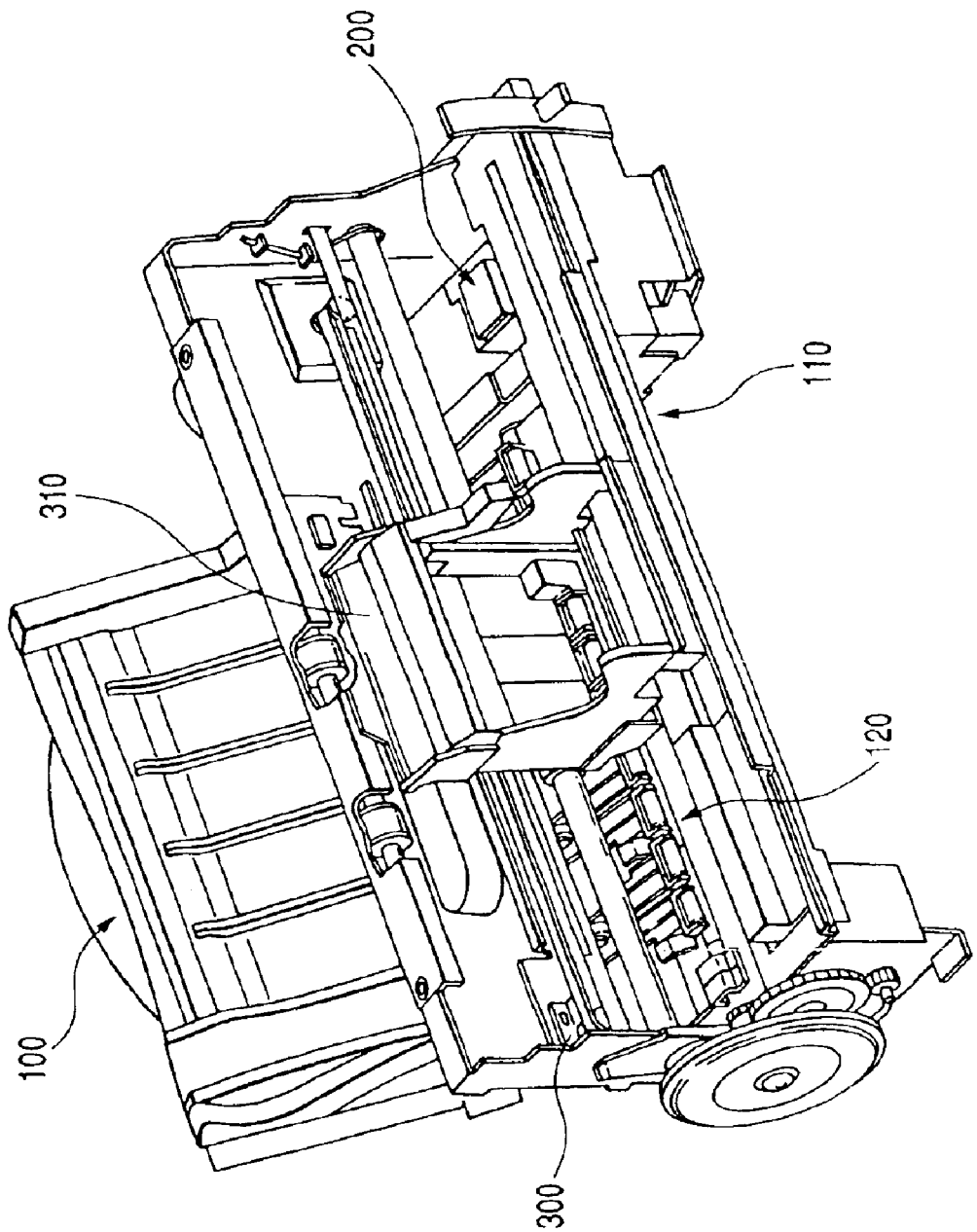
FIG. 4 is a perspective view showing the configuration of an ink jet recording apparatus to which the ink of the present invention is applicable.

FIG. 4 is a perspective view showing the configuration of an ink jet recording apparatus to which the ink of the present invention is applicable. A recording operation mechanism in the present embodiment is constituted of an automatic sheet feeding unit 100 for automatically feeding a recording (printing) medium into a main body of the apparatus, a conveying unit 120 for guiding the recording medium, supplied one by one from the automatic sheet feeding unit, to a desired printing position, and also guiding the recording medium from the printing position to a sheet discharge unit 110, a recording unit for executing a printing on the recording medium conveyed by the conveying unit, and a recovery unit 200 for executing a recovery operation for the recording unit etc. The recording unit is constituted of a carriage 310 supported movably by a carriage shaft 300, and a recording head cartridge detachably mounted on the carriage 310. The recovery unit is used for performing ink ejection not for recording before the aforementioned first-ejection time passes thereby enabling a normal ejection, in anticipation of a situation where, after the ink ejection from the ink jet ejection unit, the ink is not ejected uniformly from the nozzles constituting the ejection unit and the normal ejection becomes impossible.

Figure 5:
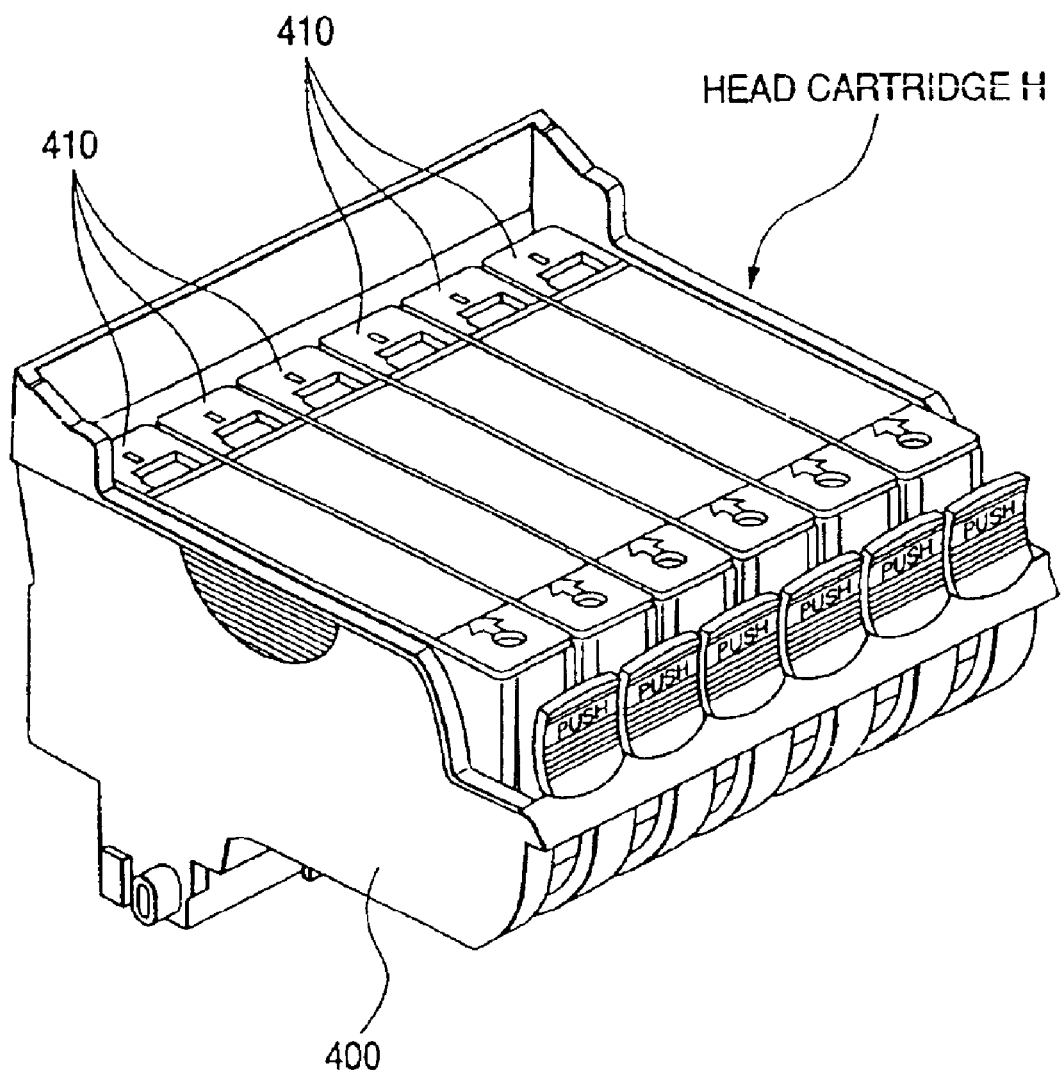
FIG. 5 is a view showing an example of the configuration of a recording head cartridge H mountable on a carriage of the ink jet recording apparatus shown in FIG. 4.

FIG. 5 shows an example of a recording head cartridge H mountable on the carriage 310 of the ink jet recording apparatus shown in FIG. 4. The present recording head cartridge H is provided with a recording head 400 for ink ejection from nozzles, and an ink tank 410 containing ink for supply to the recording head 400. The illustrated recording head cartridge H includes ink tanks independently for black (Bk), cyan (C), magenta (M), yellow (Y), pale cyan (PC) and pale magenta (PM), each being detachably mounted on the recording head 400.

Figure 6:
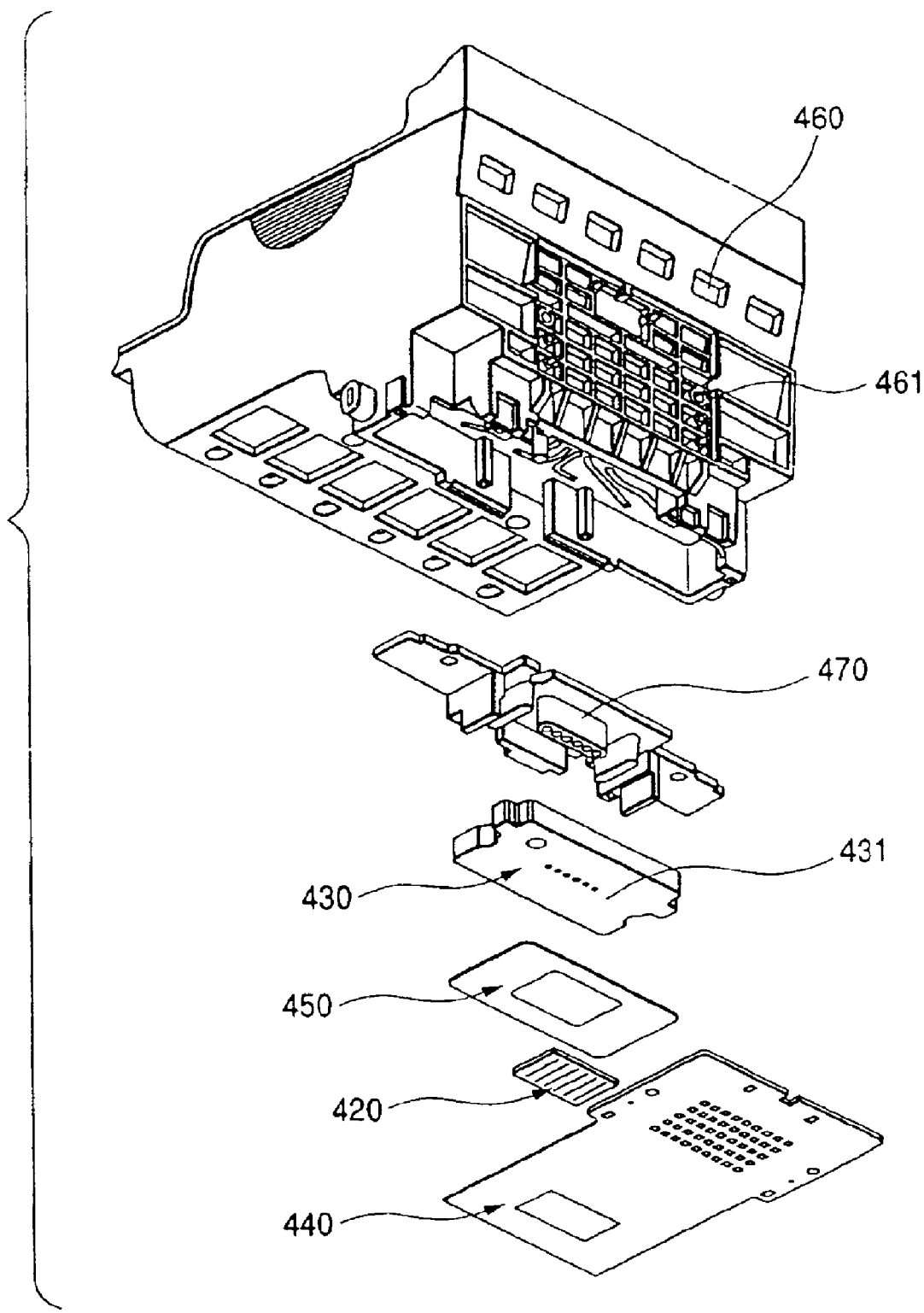
FIG. 6 is an exploded perspective view, seen from obliquely below, of the recording head cartridge shown in FIG. 5.

The recording head 400 is constituted, as shown in an exploded perspective view in FIG. 6, of a recording element substrate 420, a first plate 430, an electric wiring substrate 440, a second plate 450, a tank holder 460, and a flow path forming member 470. The recording element substrate 420 for ejecting inks of respective colors is adhered to the first plate 430 formed from aluminum oxide ($Al_2O_3$), in which an ink supply port 431 for supplying ink to the recording element substrate 420. Also the second plate 450 having an aperture is adhered to the first plate, and holds the electric wiring substrate 440, which supplies an electrical signal for ink ejection, in such a manner that it is electrically connected to the recording element substrate 420.

On the other hand, on the holder 460 detachably holding the ink tank 410, the flow path forming member 470 is attached by ultrasonic fusion, thereby forming an ink flow path 461 from the ink tank 410 to the first plate 430.

Figure 7:
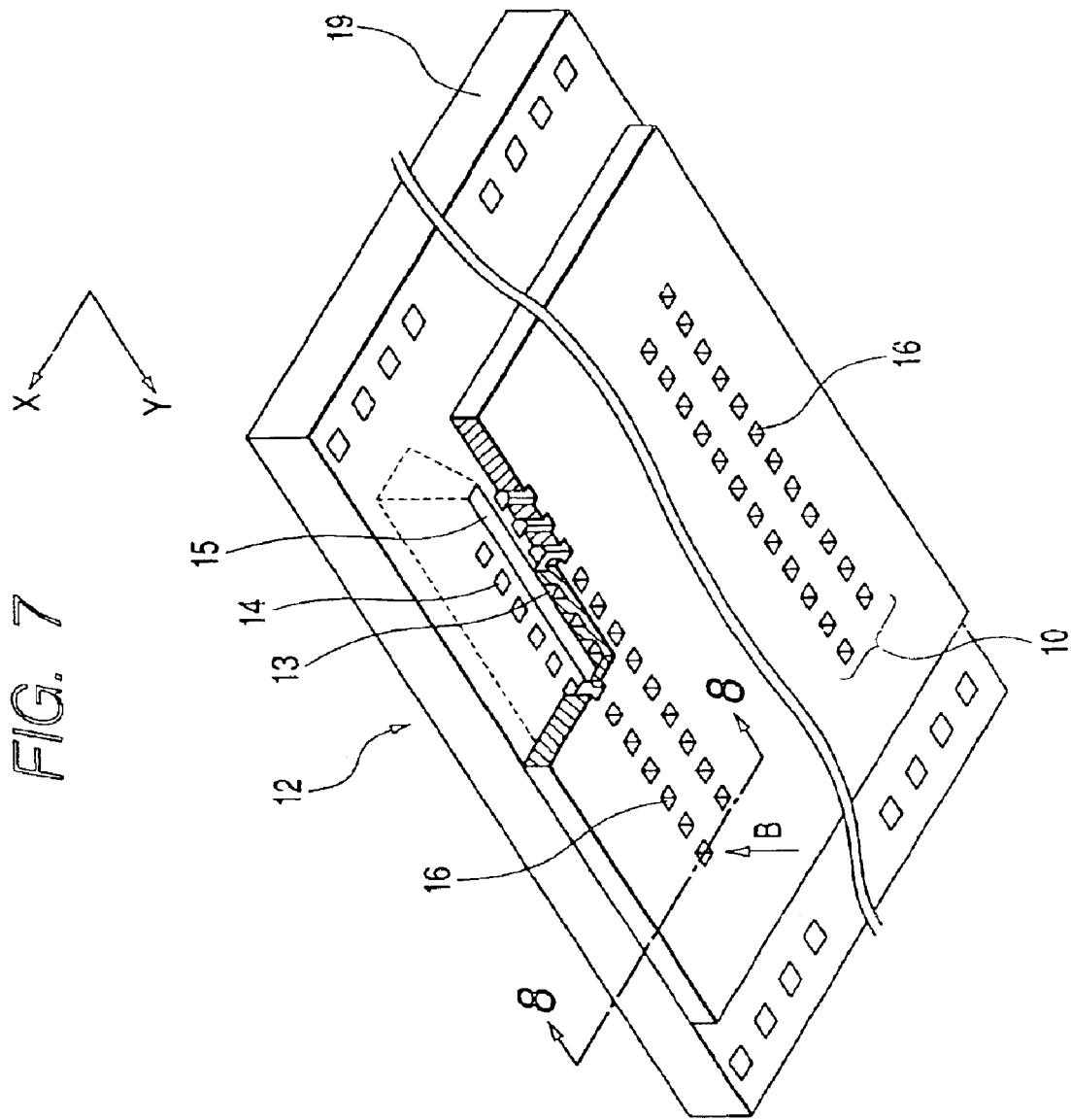
FIG. 7 is a partially cut-off perspective view showing the configuration in the vicinity of an ejection orifice of a recording element substrate shown in FIG. 6.

FIG. 7 is a partially cut-off perspective view showing structure in the vicinity of an ejection orifice of the recording element substrate 420 shown in FIG. 6. Referring to FIG. 7, on a Si substrate 19, an ink flow path wall 20 for forming an ink flow path 13 corresponding to an electrothermal converting element 14 and an ejection orifice 16 are formed by a photolithographic process, thus bearing an ejection orifices array 10. Opposed to each ejection orifice 16, an electrothermal converting element 14 is provided to generate a bubble in the ink supplied from the ink supply port 15, thereby ejecting the ink from the ejection orifice 16 and forming a record on a recording medium such as a recording sheet. As a specific example, a liquid droplet can be ejected by a single pulse of a voltage of 24 V and a pulse width of about 1 $\mu$s. The configuration may be such that the bubble generated on the electrothermal converting element 14 communicates with the external air through the ejection orifice 16 in ink ejection. An ejection amount of the ink for one ejection from the ejection orifice 16 is preferably 9 pl or less.

Figure 8:
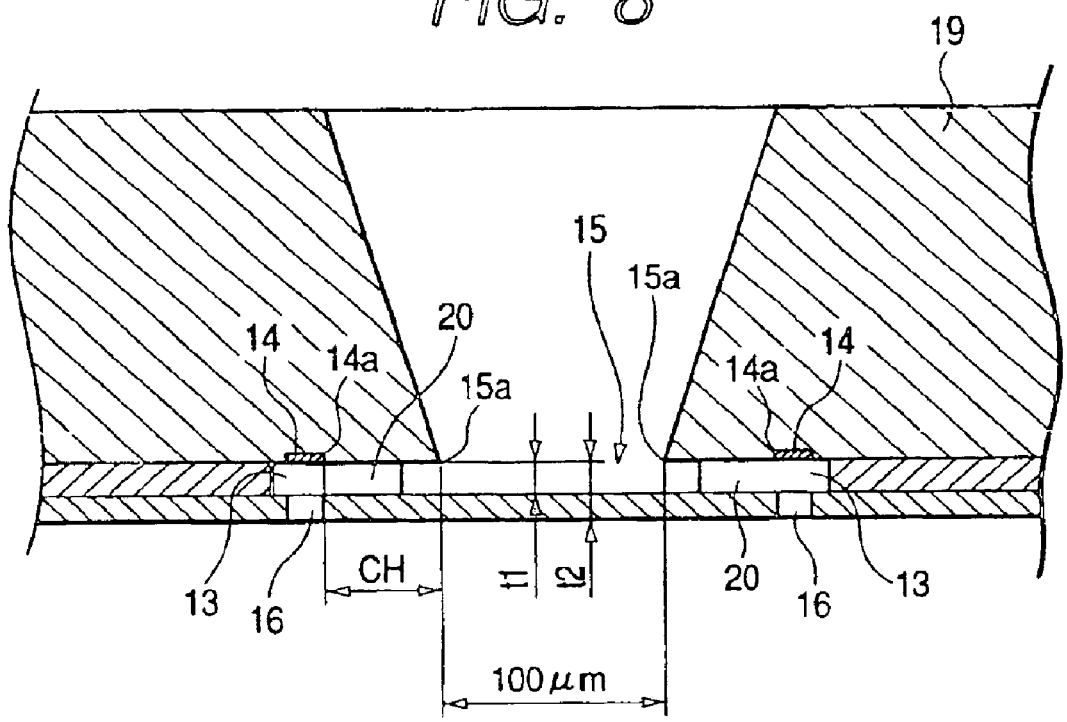
FIG. 8 is a partial cross-sectional view of the recording element substrate along the line 8—8 in FIG. 7.
Figure 9:
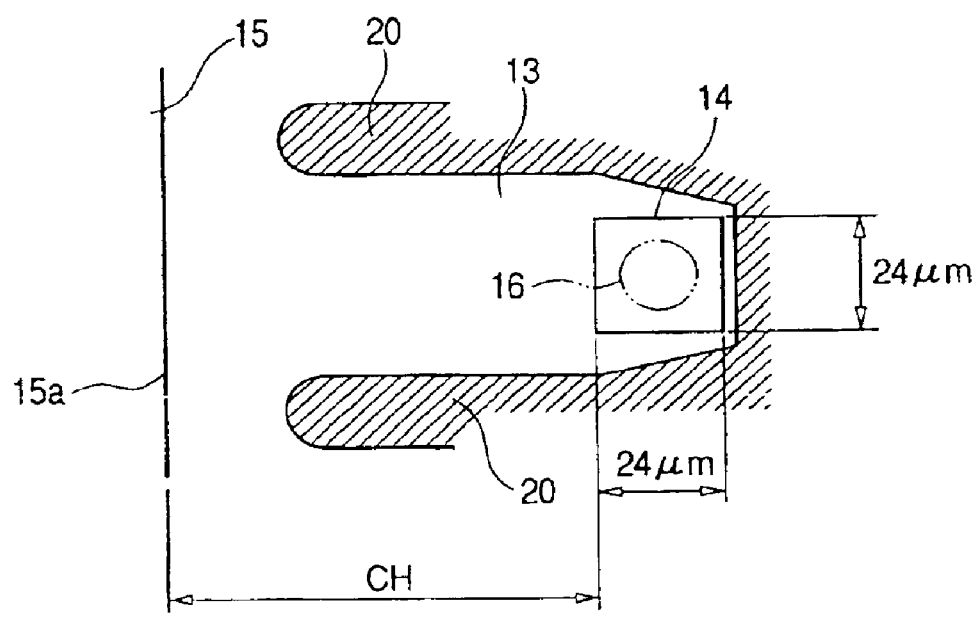
FIG. 9 is a see-through plan view of a vicinity of an electrothermal converting element seen from the direction B in FIG. 7.

On the Si substrate 19, there is provided an unillustrated temperature sensor for detecting the head temperature. FIG. 8 is a partial cross-sectional view of the recording element substrate 12 along a line 8—8 in FIG. 7. An ink flow path height t1 of the ink flow path 13 is 14 $\mu$m, and a distance t2 from the electrothermal converting element 14 to the exit side edge of the ejection orifice 16, namely to the surface of the recording element substrate 12, is 25 $\mu$m. FIG. 9 is a see-through plan view of the vicinity of the electrothermal converting element 14, seen from the direction B in FIG. 7. The electrothermal converting element 14 has a square shape of 24×24 $\mu$m. Also, a distance CH from an element end 14a of the electrothermal converting element 14 closer to the ink supply aperture 15 to an end 15a thereof is 39 $\mu$m, and the ejection orifice has a diameter of about 15.5 $\mu$m.

As explained above, the ink flow path wall 20 for forming the ink flow path 13 is formed by a photolithographic process. According to the investigation by the present inventors, there may result a peeling of such adhered portion from the Si substrate 19 in case 2-pyrrolidone is contained in a large amount in the ink. Therefore the 2-pyrrolidone content in the ink is preferably selected less than 30%, as explained in the foregoing.

FIG. 10 is a block diagram showing an example of a control system in the ink jet recording apparatus. There are shown a controller 500 constituting a main control unit, a host apparatus 510 constituting a supply source of image data and exchanging image data, commands and status signals with the controller through an interface 511, switches 520 for receiving a command input by an operator, sensors 530 for detecting a status of the apparatus, and a head driver 540 for driving ejection heaters. In case of temperature regulation of the head, head temperature detected by temperature sensors 10A, 10B is supplied to the controller 500. There are also provided a main scanning motor 550 for moving the carriage 310 in a main scanning direction, a driver 551 therefor, a sub scanning motor 560 for conveying the recording medium, and a driver 561 therefor.

The present invention is applicable not only to a recording apparatus of the serial type as explained above, but also to a recording apparatus of the full-multi type in which printing is executed in one path with a fixed head. FIG. 11 is a schematic view of a recording apparatus of such full-multi type which exhibits a particularly excellent effect by employing the ink of the present invention. The recording apparatus of this embodiment executes full-multi recording by fixing a recording head H having a nozzle array of a width substantially the same as the entire width of a recording medium and executing an image formation by the recording head while conveying the recording medium P. A side of the recording head is provided with a plurality of ejection nozzles arranged in the transversal direction of the recording head. The recording apparatus of the present embodiment is provided with a conveing belt B for conveying the recording medium, which is conveyed under contact on the entire surface thereof with the conveying belt by electrostatic attraction.

In the following, the present invention will be explained in detail by specific examples of the ink. In the present specification, "part" or "%" is based on mass, unless otherwise specified.

1) Preparation of pigment dispersion liquid 10 g of carbon black having a specific surface area of 230 m²/g and a DBP oil absorption amount of 70 ml/100 g and 3.41 g of p-aminobenzoic acid were well mixed with 72 g of water, and 1.62 g of nitric acid was dropwise added and the mixture was agitated at 70° C. After several minutes, a solution of 1.07 of sodium nitrite in 5 g of water was added and the mixture was further agitated for 1 hour. The obtained slurry was filtrated through Toyo Filter Paper No. 2 (manufactured by Advantis Inc.), and pigment particles were sufficiently rinsed with water, then dried in an oven of 90° C. and supplied with water to obtain a pigment solution of a pigment concentration of 10%. In this manner there was obtained a pigment dispersion liquid in which anionically charged self-dispersible carbon black was dispersed. This pigment dispersion liquid was used as a component of a black ink.

2) Preparation of black inks 1–22

The aforementioned pigment dispersion liquid was used for preparing Bk inks 1–4 of compositions shown in Table 1, in which the total amount of ink was set to 100 parts.

TABLE 1

|  | Bk ink | | | |
|---|---|---|---|---|
|  | 1 | 2 | 3 | 4 |
| pigment dispersion | 35 | 35 | 35 | 35 |
| C.I. food black 2 | 1.5 | 1.5 | 1.5 | 1.5 |
| diethylene glycol | 7 | 3 | — | — |
| 2-pyrrolidone | 5 | 9 | 12 | 17 |
| 1, 2, 6-hexanetriol | 5 | 5 | — | — |
| Acetylenol EH (*) | 0.2 | 0.2 | 0.2 | 0.2 |
| Water | remainder | remainder | remainder | remainder |

(*) manufactured by Kawaken Fine Chemical Co.

A Bk ink 5, not containing 2-pyrrolidone, was prepared with the following composition:

| pigment dispersion | 35 parts |
| C.I. food black 2 | 1.5 parts |
| diethylene glycol | 5 parts |
| glycerin | 7 parts |
| trimethylolpropane | 5 parts |
| water | remainder |

The aforementioned pigment dispersion liquid was used for preparing Bk inks 6–9 of compositions shown in Table 2.

TABLE 2

|  | Bk ink | | | |
|---|---|---|---|---|
|  | 6 | 7 | 8 | 9 |
| pigment dispersion | 25 | 30 | 35 | 40 |
| C.I. food black 2 | 2.5 | 2 | 1.5 | 1 |
| 2-pyrrolidone | 12 | 17 | 12 | 17 |
| trimethylolpropane | 5 | — | 5 | — |
| Acetylenol EH (*) | 0.2 | 0.2 | 0.2 | 0.2 |
| water | remainder | remainder | remainder | remainder |

(*) manufactured by Kawaken Fine Chemical Co.

A Bk ink 10, containing a self-dispersible pigment only as a colorant, was prepared with the following composition:

| pigment dispersion | 50 parts |
| C.I. food black 2 | 0 parts |
| 2-pyrrolidone | 12 parts |
| trimethylolpropane | 5 parts |
| water | remainder |

Also, the aforementioned pigment dispersion liquid was used for preparing Bk inks 11–14 in which 2-pyrrolidone was fixed at 27 mass %, Acetylenol EH was fixed at 0.2 mass % and the pigment-dye ratio was changed respectively as 5:5, 6:4, 7:3 and 7.5:2.5.

Also, the aforementioned pigment dispersion liquid was used for preparing Bk inks 15–18 in which 2-pyrrolidone was fixed at 22 mass %, Acetylenol EH was fixed at 0.2 mass % and the pigment-dye ratio was changed respectively as 5:5, 6:4, 7:3 and 7.5:2.5.

Also, the aforementioned pigment dispersion liquid was used for preparing Bk inks 19, 20 in which 2-pyrrolidone was fixed at 12 mass %, Acetylenol EH was fixed at 0.2 mass % and the pigment-dye ratio was changed respectively as 5:5 and 7.5:2.5.

Also, the aforementioned pigment dispersion liquid was used for preparing Bk inks 21, 22 in which 2-pyrrolidone was fixed at 17 mass %, Acetylenol EH was fixed at 0.2 mass % and the pigment-dye ratio was changed respectively as 5:5 and 7.5:2.5.

3) Evaluation

The first-ejection property of each of the Bk inks 1–22 was evaluated by the following method.

A printing was executed by an ink jet printer (manufactured by Canon Inc.; trade name: BJF870, nozzle resolution 1200 dpi, ejection amount ca. 4.5 pl., ejection frequency 22 kHz). An evaluation pattern was printed, under environmental conditions of a temperature of 15 to 35° C. and a humidity of 15%, on paper (manufactured by Canon Inc.; trade name: HR101), and was evaluated according to the following criteria. The pattern printing was executed under two conditions, namely when the ink was at the normal temperature and when the ink was regulated to a high temperature, and each case was evaluated. The evaluation was executed by suspending the ink ejection from the nozzle for a certain suspension time, then executing the ink ejection again, and the ink ejection state at such re-ejection was evaluated. More specifically, the suspension time was changed as 1, 4, 7, 12, 17, 24, 32 and 40 seconds, and the state of a first ink droplet re-ejected from all the nozzles was evaluated. For example, in case the ink ejection is normal after 1 second but is not normal after 4 seconds, the first-ejection time can be identified as within a range from 1 second to less than 4 seconds.

Because of such evaluation method, data in the charts shown in FIGS. 1A to 2B are represented with error bars. Also curves in the charts indicate approximate changes of the first-ejection property relative to the pigment-dye ratio. Also data for a time beyond 40 seconds are estimated values, since the evaluation was made only up to 40 seconds.

Based on the foregoing, it can be seen that the pigment-dye ratio and the 2-pyrrolidone amount are important factors in the present invention, on the first-ejection property of the ink. Also it can be seen that the characteristics are dependent also on the ink temperature, and that a larger amount of 2-pyrrolidone is preferable for use under temperature regulation and the pigment ratio showing an optimum first-ejection property shifts to a larger value by the temperature regulation.

Table 3 shows results of evaluation, in which the above-mentioned results are further ranked by following criteria. The criteria are divided into the following 10 levels from E to 6A, based on an exposure time of the ink to the air, not affecting a next ejection (first-ejection time):
[Criteria of Evaluation]
Exposure time in air, not affecting a next ejection (first-ejection time):

level E: less than 1 second
D: 1 second or longer but less than 4 seconds
C: 4 seconds or longer but less than 7 seconds
B: 7 seconds or longer but less than 10 seconds
A: 10 seconds or longer but less than 12 seconds
2A: 12 seconds or longer but less than 17 seconds
3A: 17 seconds or longer but less than 24 seconds
4A: 24 seconds or longer but less than 32 seconds
5A: 32 seconds or longer but less than 40 seconds
6A: 40 seconds or longer.

In order to restore the first-ejection property deteriorated by the absence of ink ejection for a certain time, the ink jet printer executes, in the course of a printing operation and outside a printing area, a recovery operation (preliminary discharge) of ejecting the ink of a predetermined amount until a normal ejection becomes possible.

As for practical criteria for interpreting the aforementioned evaluation criteria into an actual printing state, the level E corresponds to a time in which one line is difficult to print in a serial printer without a preliminary ejection; the level D corresponds to a time in which a reciprocating printing cycle is possible; the level C corresponds to a time in which several lines can be printed; the level B corresponds to a time in which an A4-sized recording sheet can be printed in a high-speed printing mode; and the level A or higher corresponds to a time in which plural sheets can be printed.

Since an increased number of preliminary ejections reduces the printing speed, a time of 7 seconds in which a sheet can be printed without the preliminary ejection is very effective. Also this time allows to print an A3-sized recording sheet in a printer equipped with a line head, in a high image quality mode with a high resolution and with a relatively slow printing operation.

TABLE 3

| Ink | normal temp. rank | high temp. rank |
|---|---|---|
| 1 | D | D |
| 2 | C | C |
| 3 | 4A | 2A |
| 4 | 6A | 3A |
| 5 | C | E |
| 6 | C | D |
| 7 | 5A | C |
| 8 | 2A | B |
| 9 | D | D |
| 10 | E | E |
| 11 | B | 3A |
| 12 | A | 4A |
| 13 | 2A | 6A |
| 14 | B | 4A |
| 15 | A | C |
| 16 | 2A | 2A |
| 17 | 2A | 5A |
| 18 | B | 3A |
| 19 | 2A | C |
| 20 | 2A | 2A |
| 21 | 2A | C |
| 22 | 2A | 2A |

FIGS. 3A and 3B are charts indicating the relationship between the 2-pyrrolidone amount and the first-ejection property.

FIG. 3A shows results when the ink was at the normal temperature, in which an area surrounded by a broken line was identified as a satisfactory area capable of providing a first-ejection time of 7 seconds or longer, also effectively preventing a loss of the optical image density caused by an initial ink droplet after the lapse of the first-ejection time, and providing a high quality image showing a satisfactory OD over the entire image. More specifically, in consideration of the first-ejection property, the amount of 2-pyrrolidone has to be 12% or higher. Also a pigment proportion exceeding 75% is undesirable because of a lowered dot density though the first droplet after a pause of 7 seconds or longer can be ejected. Then, in consideration of the image quality, particularly for improving OD, the pigment ratio has to be 50% or higher as explained before. Also in consideration of the reliability for the equipment, the amount of 2-pyrrolidone is less than 30% as an upper limit, preferably 27% or less.

The range providing a satisfactory first-ejection property and a high image quality with satisfactory OD in the entire image, represented by the aforementioned relations, is indicated by the following formulas, in which X (mass %) is the amount of 2-pyrrolidone in the ink and Y is the ratio of the pigment to the colorants:

$$12 \leq X < 30$$

$$Y \geq -2X + 84$$

$$50 \leq Y \leq 75$$

A more preferred range is defined by the following formulas:

$$12 \leq X \leq 27$$

$$Y \geq -2X + 84$$

$$50 \leq Y \leq 75.$$

FIG. 3B shows results when the ink was at the high temperature, in which an area surrounded by a broken line was identified as a satisfactory area capable of providing a first-ejection time of 7 seconds or longer, also effectively preventing a loss of the optical image density caused by an initial ink droplet after the lapse of the first-ejection time, and providing a high quality image showing a satisfactory OD over the entire image. More specifically, in consideration of the first-ejection property, the amount of 2-pyrrolidone has to be 12% or higher, but the proportion of the pigment varies depending upon the content thereof. However a pigment proportion exceeding 75% is undesirable because of a lowered dot density though the first droplet after a pause of 7 seconds or longer can be ejected. Then, in consideration of the image quality, particularly for improving OD, the pigment ratio has to be 50% or higher as explained before. Also in consideration of the reliability for the equipment, the amount of 2-pyrrolidone is less than 30% as an upper limit, preferably 27% or less.

The range providing a satisfactory first-ejection property and a high image quality with satisfactory OD in the entire image, represented by the aforementioned relations, is indicated by the following formulas, in which X (mass %) is the amount of 2-pyrrolidone in the ink and Y is the ratio of the pigment to the colorants:

$$12 \leq X < 30$$

$$Y \geq (-4/3)X + 86$$

$$50 \leq Y \leq 75.$$

A more preferred range is defined by the following formulas:

$$12 \leq X \leq 30$$

$$Y \geq (-4/3)X + 86$$

$$50 \leq Y \leq 75.$$

What is claimed is:

1. An ink for use in ink jet recording comprising:

a dye and a pigment as colorants, wherein said pigment is a self-dispersible pigment in which at least one anionic group is bonded directly or through another atomic group to a surface of said pigment, said dye is an anionic dye, 2-pyrrolidone is further contained as a solvent, and the mass-based content X of 2-pyrrolidone in the ink and the ratio Y of said pigment to the sum of said dye and said pigment satisfy the following formulas 1 to 3 at the same time:

$$12 \leq X < 30 \qquad \text{formula 1}$$

$$50 \leq Y \leq 75 \qquad \text{formula 2}$$

$$Y \geq -2X + 84 \qquad \text{formula 3.}$$

2. An ink for use in ink jet recording comprising:

a dye and a pigment as colorants, wherein said pigment is a self-dispersible pigment in which at least one anionic group is bonded directly or through another atomic group to a surface of said pigment, said dye is an anionic dye, 2-pyrrolidone is further contained as a solvent, and the mass-based content X of 2-pyrrolidone in the ink and the ratio Y of said pigment to the sum of said dye and said pigment satisfy the following formulas 1 to 3 at the same time:

$$12 \leq X < 30 \qquad \text{formula 1}$$

$$50 \leq Y \leq 75 \qquad \text{formula 2}$$

$$Y \geq (-4/3)X + 86 \qquad \text{formula 3.}$$

3. The ink according to claim 1 or 2, wherein said dye includes at least one disazo dye or trisazo dye.

4. The ink according to claim 1 or 2, wherein the ink has a Ka value as determined by Bristow's method of less than 1 ml·m$^{-2}$·msec$^{-1/2}$.

5. An ink for use in ink jet recording comprising:

a self-dispersible pigment in which at least one anionic group is bonded directly or through another atomic group to a surface of said pigment and an anionic dye as colorants; and 2-pyrrolidone as a solvent, wherein the mass-based content X % of 2-pyrrolidone in the ink and the ratio Y % of said pigment to the sum of said dye and said pigment respectively satisfy $10 < X < 30$ and $50 \leq Y \leq 75$, and the ink has a first-ejection time of 7 seconds or longer as measured with an ink jet head of an ejection amount of 4.5 picoliters.

6. An ink jet recording method comprising:

a step of providing an ink comprising a dye and a pigment as colorants, wherein the pigment is a self-dispersible pigment in which at least one anionic group is bonded directly or through another atomic group to a surface of the pigment, the dye is an anionic dye, 2-pyrrolidone is further contained as a solvent, and the mass-based content X of 2-pyrrolidone in the ink and the ratio Y of the pigment to the sum of the dye and the pigment satisfy the following formulas 1 to 3 at the same time:

$$12 \leq X < 30 \qquad \text{formula 1}$$

$$50 \leq Y \leq 75 \qquad \text{formula 2}$$

$$Y \geq -2X + 84; \text{ and} \qquad \text{formula 3}$$

a step of ejecting the ink on a recording medium.

7. An ink container containing the ink according to any one of claims 1, 2 and 5.

8. An ink jet recording method comprising:

a step of providing an ink comprising a dye and a pigment as colorants, wherein the pigment is a self-dispersible pigment in which at least one anionic group is bonded directly or through another atomic group to a surface of the pigment, the dye is an anionic dye, 2-pyrrolidone is further contained as a solvent, and the mass-based content X of 2-pyrrolidone in the ink and the ratio Y of the pigment to the sum of the dye and the pigment satisfy the following formulas 1 to 3 at the same time:

$$12 \leq X < 30 \qquad \text{formula 1}$$

$$50 \leq Y \leq 75 \qquad \text{formula 2}$$

$$Y \geq (-4/3)X + 86; \text{ and} \qquad \text{formula 3}$$

a step of ejecting the ink on a recording medium.

9. The method according to claim 8, wherein the ink is ejected by an ink jet recording apparatus including heating means capable of heating the ink during a printing operation, and control means which controls the heating means to maintain the ink within a specified temperature range.

10. The method according to claim 9, wherein the specified temperature range is from 40 to 60° C.

11. The method according to claim 9, wherein the specified temperature range is from 40 to 50° C.

12. An ink jet recording method comprising:

a step of providing an ink comprising a self-dispersible pigment in which at least one anionic group is bonded directly or through another atomic group to a surface of the pigment and an anionic dye as colorants, and 2-pyrrolidone as a solvent, wherein the mass-based content X % of 2-pyrrolidone in the ink and the ratio Y % of the pigment to the sum of the dye and the pigment respectively satisfy $10 < X < 30$ and $50 \leq Y \leq 75$, and the ink has a first-ejection time of 7 seconds or longer as measured with an ink jet head of an ejection amount of 10 picoliters or less; and a step of ejecting the ink on a recording medium.

13. The method according to claim 12, wherein the ejection amount of the ink jet head is 4.5 picoliters.

* * * * *

UNITED STATES PATENT AND TRADEMARK OFFICE
CERTIFICATE OF CORRECTION

PATENT NO. : 6,964,700 B2 Page 1 of 1
APPLICATION NO. : 10/830013
DATED : November 15, 2005
INVENTOR(S) : Ayako Uji et al.

It is certified that error appears in the above-identified patent and that said Letters Patent is hereby corrected as shown below:

COLUMN 7:

Line 39, "formula 4" should read --formula 3--.

COLUMN 8:

Line 16, "metal for" should read --metal for "M"--.

COLUMN 10:

Line 61, "can-be" should read --can be--.

COLUMN 12:

Line 60, "conveing" should read --conveying--.

Signed and Sealed this

Thirteenth Day of February, 2007

JON W. DUDAS
*Director of the United States Patent and Trademark Office*